March 21, 1939.  C. P. DEIBEL  2,151,193
DRY CELL BATTERY UNIT
Filed Oct. 29, 1936
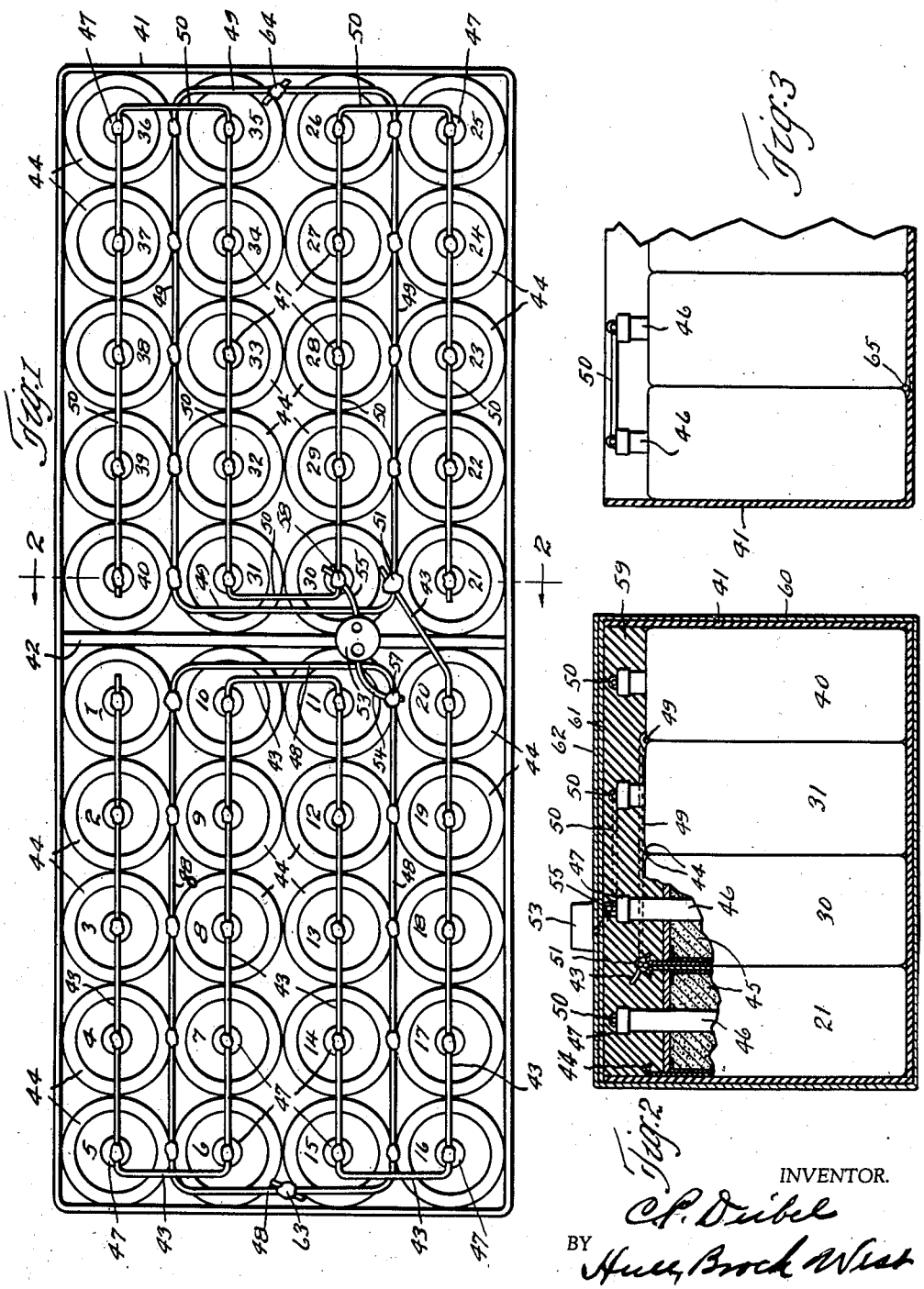
INVENTOR.
C. P. Deibel
BY
Huey Brock West
ATTORNEY.

Patented Mar. 21, 1939

2,151,193

UNITED STATES PATENT OFFICE 2,151,193

DRY CELL BATTERY UNIT

Cyril P. Deibel, Lakewood, Ohio

Application October 29, 1936, Serial No. 108,204

6 Claims. (Cl. 136—108)

This invention relates to a dry cell battery unit and has particular reference to the manner of arranging and connecting the cells so as to reduce the number of soldered connections and to enable such connections to be soldered with a minimum number of operations.

A dry cell battery unit with which this invention is concerned consists essentially of a plurality of cells which are arranged within a carton in contacting relation, each cell consisting of a zinc can in which is arranged a carbon electrode and a mass of depolarizing mix. Heretofore it has been customary when connecting the cells in parallel to connect a wire to the carbon electrodes of the cells and also to connect the zinc cans together by means of a wire which is soldered thereto, usually to the bottoms of the cans. Therefore, it will be seen that with a battery unit consisting of forty cells it was necessary to provide at least eighty soldered connections. With my arrangement and manner of connecting the cells I am able to reduce the number of soldered connections practically fifty percent. I am also able to make all of these soldered connections without moving the cells and after they have been positioned within a carton or container, all of the connections being disposed at the tops of the cells where they are readily accessible.

Further and more limited objects of the invention will appear as the description proceeds and by reference to the accompanying drawing in which Fig. 1 is a top plan view of a battery unit with the cells arranged within an inner carton but before the unit has been enclosed within an outer carton; Fig. 2 is a vertical sectional view on the line 2—2 and Fig. 3 is a fragmentary view partly in section and partly in elevation disclosing a slightly modified form of my invention.

Referring now to the drawing my battery unit preferably consists of forty cells which are indicated by the reference characters 1 to 40 inclusive and which are arranged within a carton 41 in two groups which are separated by a partition 42. The carbons of the cells of the first group, at the left as seen in Fig. 1, are connected together by means of a wire 43 which is soldered to the metal caps on each of the carbons as shown. Each of the cells comprises a zinc can the upper edge of which is turned over inwardly as shown at 44. Arranged within each cell is a mass of mix 45 in which is positioned a carbon electrode 46 which receives thereover a metal cap 47. It will be seen that the zinc cans are arranged in pairs and that the turned over portion of each can serves to provide a space which receives the connecting wire therein. The zinc cans of the first group of cells are connected together by means of a wire 48 which is disposed in the space provided by the turned over portions of the cans. The zinc cans of the second group of cells are likewise connected together by means of a wire 49. The carbon electrodes of the second group of cells are connected together by means of a wire 50 which is soldered to the metal caps 47 on each of the carbon electrodes as shown. The wire 43 is connected with the wire 49 by means of a drop of solder 51 and the wire 50 is connected with the wire 48 by means of a drop of solder 52. In order to provide a universal terminal connection I provide a socket 53 one side of which is connected to the wire 48 by means of a wire 54 and the opposite side of which is connected to the wire 50 by means of a wire 55 so that the terminal is connected to the negative side of the first group of cells and to the positive side of the second group of cells, the cells of each group being connected in parallel so as to give a battery unit producing 3 volts with each cell having a voltage of 1½ volts. In assembling the battery unit the cells are first arranged within the inner carton 41 in the manner illustrated in Figs. 1 and 2. The zinc cans of the cells in each group are then soldered together by positioning wires 48 and 49 between the turned-over portions of the tops of the cans and soldering to adjacent pairs of cans in a single operation for each pair so that the wire is connected with both cans by a single drop of solder. The wires 43 and 50 are then soldered to the metal caps on the carbon electrodes of each of the cells. The wire 43 is brought over the partition and soldered to negative wire 50 by a drop of solder 51, thereby connecting the two parallel groups in series. The wire 54 of the terminal 53 is then soldered to the negative wire 48 by means of a drop of solder 57; and the terminal wire 55 is soldered to the positive wire 50 by means of a drop of solder 58 on the carbon electrode of cell 30. The ends of the wires 48 and 49 are connected together by means of drops of solder indicated at 63 and 64. A layer of sealing material 59 is then poured over the top of the cells about up to the level shown in Fig. 2 and which may consist of tar, wax, pitch or any other suitable battery sealing material. The battery unit thus provided is then inserted into an outer carton 60 which may be formed of paper, cardboard or other suitable material. The flaps 61 and 62 are then closed and have coinciding openings provided therein so that the terminals 53 may be accessible.

It will thus be seen that by positioning the wire which connects the zinc cans together with the space provided by the turned over top portions of the zinc cans I am able to reduce the number of soldering operations fifty percent. I am also able to solder the wire to two adjacent cans in a single soldering operation. These connections being disposed at the top of the unit enables me to make these connections at the same time that the connections are made with the carbon electrodes of the cells. All of the soldered connections are disposed at the tops of the cells and readily accessible so that the cells may be first arranged in a carton and all of the soldering operations performed without moving the cells.

In Fig. 3 I have disclosed a slightly modified form of my invention which is identical with that shown in Figs. 1 and 2 except that the zinc cans are connected together by means of a wire 65 which is disposed at the bottoms of the cans instead of at the top. The zinc cans of which batteries are formed are usually formed by an extrusion or drawing process so that the bottoms of the cells have a slight radius sufficient to provide a space to receive the wire between adjacent cans so that the wire may be soldered to two adjacent cans in a single operation. The only difference between the form of the invention shown in Fig. 3 and that shown in Figs. 1 and 2 is that the wires which connect the zinc cans are disposed at the bottoms of the cans instead of at the tops.

It will now be clear that I have provided a battery unit and a method of connecting the several cells which will accomplish the objects of the invention as hereinbefore stated. It is of course to be understood that the embodiments of the invention herein disclosed are to be considered merely as illustrative and not in a limiting sense as various changes may be made in details without departing from the spirit of my invention. The invention is therefore limited only in accordance with the scope of the appended claims.

Having thus described my invention, what I claim is:

1. A dry cell battery unit comprising a plurality of cells arranged within a carton and connected in parallel, each cell consisting of a zinc can in which is arranged a mass of mix and a carbon electrode, each of said cans having the upper edges thereof bent inwardly and a wire disposed in the space provided by the inwardly bent portions of adjacent pairs of cans and rigidly connected to both such cans.

2. A dry cell battery unit comprising a plurality of cells arranged within a carton and connected in parallel, each cell consisting of a zinc can in which is arranged a mass of mix and a carbon electrode, each of said cans having the upper edges thereof turned over inwardly, a wire connecting a plurality of said cans and disposed in the space provided by the turned over portions of adjacent pairs of cans and soldered thereto.

3. A dry cell battery unit comprising a plurality of dry cells arranged within a carton in two groups, each cell consisting of a zinc can containing a mass of mix and a carbon electrode, said cans having the upper edges thereof turned over inwardly, a wire connecting the cans of one group and connected to the turned over portions of adjacent cans, a second wire connecting the carbon electrodes of said first group, a third wire connecting the cans of the second group and connected to the turned over portions of adjacent cans, a fourth wire connecting the carbon electrodes of the second group and connecting with a zinc can of the first group and a terminal socket connected with a carbon electrode of said first group and with a zinc can of said second group.

4. A dry cell battery unit comprising a plurality of dry cells arranged in a carton and connected in parallel, each cell consisting of a zinc can in which is arranged a carbon electrode and a mass of mix, such cans being arranged in pairs and contacting each other and having the bottoms thereof curved so as to provide a space between adjacent pairs of cans, a wire disposed in such space and soldered to such cans and a wire connecting the carbon electrodes of a plurality of such cells.

5. A dry cell battery unit comprising a plurality of cells arranged within a carton and electrically connected with each other, each cell consisting of a metal can in which is arranged a mass of mix and a central electrode, each of said cans having adjacent edges thereof rounded so as to provide a space to receive a wire therein, a wire disposed in the space provided by such rounded edges of adjacent pairs of cans and rigidly connected to such cans and a terminal for said unit.

6. A dry cell battery unit comprising a plurality of cells electrically connected with each other and arranged within a carton in the same plane and with the longitudinal axes thereof parallel, each cell consisting of a metal can in which is arranged a mass of mix and a central electrode, each of said cans having adjacent edges thereof bent on a radius so as to provide a space between adjacent pairs of cans to receive a wire therein, a wire disposed in the space provided by such bent portions of adjacent pairs of cans and a single drop of solder rigidly connecting such wire to adjacent pairs of cans, a second wire connecting the central electrodes of said cells, and a terminal unit to which both said wires are connected.

CYRIL P. DEIBEL.